United States Patent Office 3,378,764
Patented Apr. 16, 1968

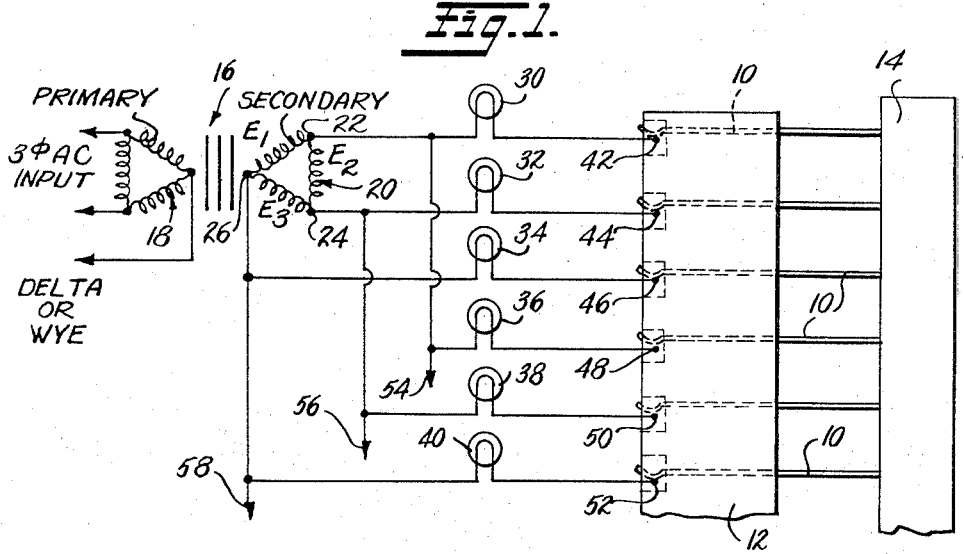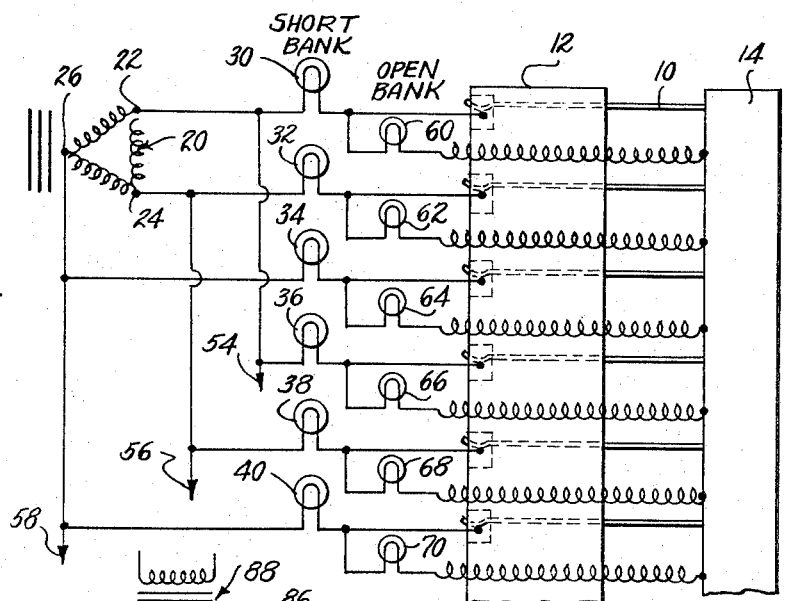

3,378,764
ELECTRICAL CONTINUITY AND SHORT CIRCUIT TESTING DEVICE EMPLOYING ILLUMINATED INDICATORS
John Robert Peltz and Clayton L. Stoldt, Warren, Pa., assignors to Sylvania Electric Products Inc., a corporation of Delaware
Filed July 20, 1966, Ser. No. 566,635
7 Claims. (Cl. 324—51)

ABSTRACT OF THE DISCLOSURE

An electrical continuity and short circuit testing device utilized for checking a plurality of electrode means insulatively spaced from one another whereof each has a contact portion and an end terminal. The device employs a source of electrical potential and at least two sets of a like number of lamps, the lamps of the first set or "Short Bank" function as visual short circuit indicators while those of the second set or "Open Bank," which have lower current ratings, provide individual continuity indicators. The lamp circuits of the two banks are interconnected in a manner whereby a pair of lamps in each of the banks functions in a related manner to indicate discontinuities in the electrode means or short circuits therebetween.

---

This invention relates to a continuity and short circuit tester utilizing a number of indicators and more particularly to a continuity and short circuit tester adapted to perform the tests wherein a multitude of circuits may be tested simultaneously.

It is an object of this invention to enable the tests to be made without the use of equipment with moving parts, such as switches, relays and the like, and without the use of expensive parts, such as semiconductors or electron tubes.

It is a further object of this invention to provide a continuity and short circuit tester wherein the indicators are merely small incandescent lamps.

It is a still further object of this invention to so arrange the circuitry that only in malfunctioning circuits amongst the multitude of circuits tested will the lamps be clearly lit, the remaining lamps seeming to or appearing to be unlit.

For a better understanding of the present invention, together with other and further objects, advantages and capabilities thereof, reference is made to the following disclosure and appended claims in connection with the accompanying drawings in which:

FIG. 1 is a drawing illustrating a simple testing circuit involving incandescent lamps from which circuit certain shortcomings can be ascertained.

FIG. 2 is a circuit diagram of a continuity and short testing device made in accordance with the invention; and FIG. 3 is a diagrammatic view of an adjunct which may be utilized with a testing device to detect the existence of an excessively bent electrode or off-position electrode on a contact block under test.

Now referring to the drawings in greater detail, in FIG 1 there is indicated a simple testing device involving incandescent lamps as the indicators.

As many lamps are employed as there are circuit electrodes existent. For purposes of illustration, it is supposed that it is desired to test the continuity of electrodes such as contact terminals 10 located in a contact block 12. The contact block may, for example, comprise any number of contact terminals arranged in a column longitudinally of a parallelepiped and any number of contact terminals arranged in rows transversely of the longitudinal array of contacts. To test these contacts a metal shorting bar 14 is employed, which bar may sequentially be placed in contact with the ends of the terminals in the different rows or columns of terminals or a group of bars may be simultaneously applied to all of the rows or columns. In order to avoid shock hazard to an operator making the test, should an operator rather than a machine be employed for operation of the bar, the voltages are obtained from a step-down transformer, for example, a three phase transformer 16. The primary 18 of the transformer may be delta or Y connected to a three phase supply and the secondary has three multiphase windings furnishing voltages of equal potential. As a concrete example, it is supposed the voltage across each winding $E_1$, $E_2$, or $E_3$ is 12 volts. The indicator lamps employed would each then have a potential half of the voltage in any of the secondary windings, in this instance 6 volts. Furthermore, all of the lamps are of the same character and therefore are designed to carry the same current. Indicating the delta junctions of the secondary of the transformer as 22, 24, and 26, one pole of a lamp 30 is connected to terminal 22 as is a pole of lamp 36; a pole of a lamp 32 is connected to terminal 24, as is a pole of a lamp 38 and a pole of a lamp 34 is connected to terminal 26, as is a pole of lamp 40. The opposite pole of each lamp is connected to its own respective contacts 42, 44, 46, 48, 50 and 52, these being positioned for making contact with one end of the terminals 10 in the contact block under test.

When a shorting bar is applied to the other ends of the terminals in block 12, all lamps will light up to full brilliancy should there be no open circuit in the contact block, it being assumed, of course, that the lamps, etc. in the testing device are in proper condition, as is the case with any testing instrumentality.

For example, in the above test, lamps 30 and 32 will light with 12 volts applied to the two series connected 6 volt lamps, the current flowing in series from junction 22 through lamp 30, contact 42 and associated terminal 10, the shorting bar 14, a second terminal 10, contact 44, lamp 32 and junction 24 of winding $E_2$. An unlit lamp indicates a discontinuity in the associated circuit. Thus should terminal 10 associated with contact 44 be missing or broken, lamp 32 will not light. However, lamp 30 will still light for the circuit for that lamp will be completed via the shorting bar, contact 46 and lamp 34 to the junction 26, or via lamps 38 or 40 to junction 24 or 26.

The likelihood of all of the contacts necessary to light the lamp 32 being open is exceedingly small and the chances are minimized when, as is the case with these blocks, the wires leading to lamps are multiple connected as by extensions 54, 56, and 58 to still other sets of lamps, the shorting bar thereby affording multiple return paths for any one lamp.

The same apparatus can be utilized for detecting shorts between the terminals 10 by removing the shorting bar. If a short occurs between terminals connected to contacts 42 and 44, lamps 30 and 32 will light, indicating the location of the short; the other lamps remain unenergized. Similarly, if a short occurs between the terminals connected to contacts 42 and 46, only lamps 30 and 34 will light, indicating the location of the short condition.

If, however, a short occurs between two terminals at common potential, as the terminals connected to contacts 42 and 48, it will not be detected. This shortcoming can be minimized by installing a requisite multiphase source and associated indicating devices. From a practical standpoint, however, the probability of a short occurring between terminals of common potential and not simultaneously occurring to any other terminal of the block approaches zero.

However, the difficulty with the above-described tester is that in making continuity tests, the operator must search for the one lamp (or perhaps a few more) that is not illuminated amongst a larger number of lamps, particularly where a large number of terminals are under test simultaneously.

Accordingly, a device is described wherein an identification of a discontinuity amongst a large number of terminals is made manifest by the full lighting of a lamp amongst all of the others. This type of identification would allow the use of a simple AND-OR gate via photoelectric means so that the full illumination of any lamp or combination of lamps could be reduced to a "go-no-go" function.

The improved circuit, made in accordance with this invention, is shown in FIG. 2 in which parts common with parts in FIG. 1 have the same reference characters.

The improved circuit involves the use of a second set of indicator lamps differing in characteristic from the set of lamps previously described, each lamp of the second set being permanently connected in between the pole of the lamp of the first set which is connected to a contact, as the pole of lamp 30 connected to contact 42, and the shorting bar 14.

The first set of lamps is termed as being lamps of the "Short Bank" and the second set of lamps is termed as being lamps of the "Open Bank." The lamps of the second set or "Open Bank" are numbered 60, 62, 64, 66, 68 and 70. All of the lamps of both banks have the same voltage rating. However, the current rating of the lamps in the "Short Bank" is much larger than, preferably twice, that of the lamps in the "Open Bank." For example, assuming the voltage across each of the secondaries is 20 volts, the lamps would each have a 10 volt rating. However, the "Short Bank" lamps would have a rating of 40 ma. for normal brilliancy and the "Open Bank" lamps would have a similar rating of 20 ma. These may be Sylvania type 10ESB and 10CSB lamps, respectively. Type 10ESB has a hot resistance of 250 ohms and a cold resistance of 28 ohms. Type 10CSB has a hot resistance of 500 ohms and a cold resistance of 115 ohms.

Assuming a terminal block to be coupled with the tester, when the secondary of the transformer is energized and the shorting block is not applied to the terminals in the terminal block, all of the lamps actually will be lit, but those in the "Short Bank," because the current flow therethrough is much less than the normal flow, would appear to be unlit, particularly with a colored coating thereon. In any given circuit four lamps would be in series, for example, lamps 30, 60, 62 and 32, and there would be approximately a 1 volt drop across a "Short Bank" lamp but a 9 volt drop or near normal voltage drop across an "Open Bank" lamp.

If a short circuit occurs across any terminals in the block, for example across the first two terminals at the top of the block, the associated "Open Bank" lamps 60 and 62 would be shorted out and the corresponding "Short Bank" lamps 30 and 32 would then have full potential applied to them causing their filaments to glow at full brilliancy and be made easily visible to an operator. Thus, a short between any terminals is made visible by a full lighting of lamps in the "Short Bank" and a concomitant extinguishing of the lamps in the "Open Bank." Obviously as many lamps in the "Short Bank" will be fully illuminated as there are shorted terminals.

Thus when the shorting bar is held out of contact with the terminals 10, a short circuit between terminals will be indicated by visible illumination of a "Short Bank" lamp, all of the other "Short Bank" lamps being dark and apparently unlit. With the simple application of the shorting bar to the terminals an open terminal will be indicated by the visible illumination of a lamp in the "Open Bank," all of the other lamps in that bank being dark and apparently unlit.

The bar is at secondary potential. However, if desired, it may additionally be grounded to insure protection of an operator against shock.

Any number of lamps may be used in a bank, dependent on the number of terminals shorted by the shorting bar. If a series of terminal blocks having less terminals contacted by the shorting bar be under test than there are lamps, the extra lamps, if desired, may be masked off. The shape of the shorting bar can, of course, be formed to conform with the positions of terminals in a block. For example, a zigzag arrangement of terminals would mean the use of a thicker block to engage all of the terminals or a zigzagged block; a circular array of terminals would call, for example, for a disc shorting element or a ring-shaped shorting element.

Since a common connection in the form of a bar 14 is utilized in the above tests, by using a circuit as shown in FIG. 3, a connector or terminal block can be easily tested for off-location or bent terminals. In FIG. 3, at 80, is shown in cross section a rectangular conductive plate, perforated at 82 to register with the normal position of a terminal. A bent portion, as portion 84 of a terminal, or an off-location terminal would be engaged by the plate while the others would not, thereby illuminating the lamp 86, which has a voltage rating conforming to the voltage rating of an associated transformer secondary 88. Of course, the lamp 86 may be replaced by any other form of indicator, as a bell or ammeter and the transformer 88 replaced by a D.C. source. If desired the D.C. source may be applied across one of the secondary windings of the three phase transformer.

Thus, an improved continuity and short circuit tester is provided wherein visual indicators denote malfunctioning circuits under test. Such testing is expeditiously accomplished without the utilization of moving devices such as switches, relays and the like and without the use of expensive components, such as semi-conductors or electron tubes.

While there has been shown and described what is at present considered the preferred embodiment of the invention, it will be obvious to those skilled in the art that various changes and modifications may be made therein without departing from the scope of the invention as defined by the appended claims.

What is claimed is:

1. An electrical device for simultaneously testing a plurality of electrode means insulatively oriented one from the other whereof each has a contact portion and an end terminal, said device having a plurality of individual lamps of a first set functioning as visual indicators for detecting short circuits between said electrode means and a like plurality of individual lamps of a second set providing individual indicating means for checking the continuities between the contact portions and the end terminals of said electrode means, said device comprising:

a source of electrical potential having poles of opposite polarity;

at least a first pair of lamps of said first set, said first pair being connected respectively to the poles of said source of potential;

at least a pair of device contacts formed to mate with said contact portions of said electrode means, there being at least one device contact for each of said first set of lamps, each lamp being in series with a pole of said source of potential and one of said device contacts to form a portion of a short detecting circuit in said device;

device shorting means capable of being moved and formed to make temporary contact with said electrode end terminals to facilitate continuity checking of said electrode means; and at least a second pair of lamps of said second set, each lamp having one pole thereof electrically connected in a permanent manner to said shorting means with the other lamp pole being connected into said short detecting circuit between a lamp of said first pair and an associated device contact to form a portion of a continuity checking circuit in said device, said second pair of lamps having a voltage rating equal to that of said first pair of lamps and a current rating lower than that of said first pair of lamps.

2. A tester as set forth in claim 1 in which the voltage rating of each lamp of the second pair is half that of the source potential.

3. A tester as set forth in claim 1 in which the current rating of the second pair of lamps is half that of the first pair of lamps.

4. A tester as set forth in claim 1 wherein the lamps are incandescent lamps and the bulbs of the first pair of lamps are colored to hide a faint incandescence of the first pair of lamps.

5. A tester as set forth in claim 1 in which a multiple number of circuits involving the two pairs of lamps and associated contacts are coupled to the same source of potential.

6. A tester as set forth in claim 1 in which the source of potential is a secondary of a transformer having multiple phase windings.

7. A tester as set forth in claim 1 including a perforated conductive plate, connected to said device shorting means thru an indicator and a source of potential.

References Cited

UNITED STATES PATENTS 2,977,530   3/1961   Cook _____ 324—51
3,217,244   11/1965   Glover _____ 324—51

RUDOLPH V. ROLINEC, *Primary Examiner.*

G. R. STRECKER, *Assistant Examiner.*